March 14, 1967
C. J. STALEGO
3,309,184
METHOD AND APPARATUS FOR FLOWING STREAMS
OF HEAT-SOFTENED MATERIAL FROM A SUPPLY
Original Filed Jan. 22, 1962
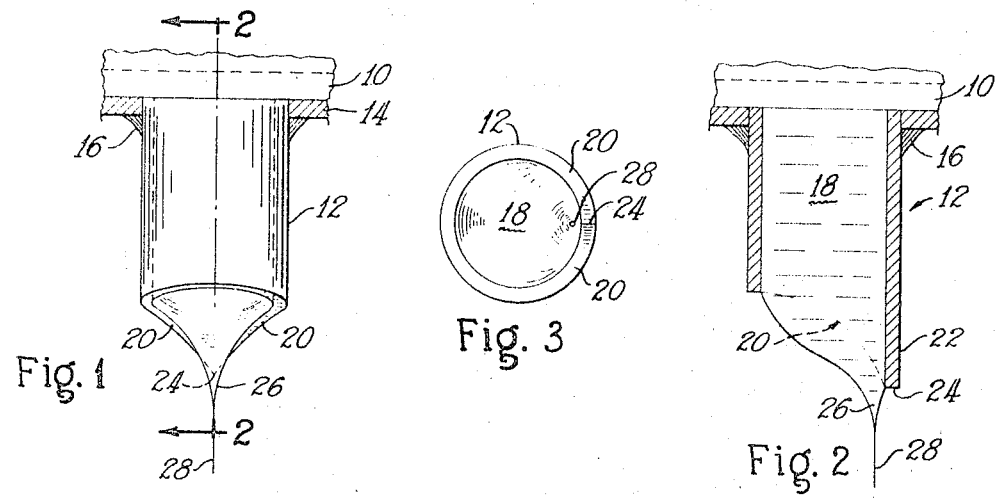
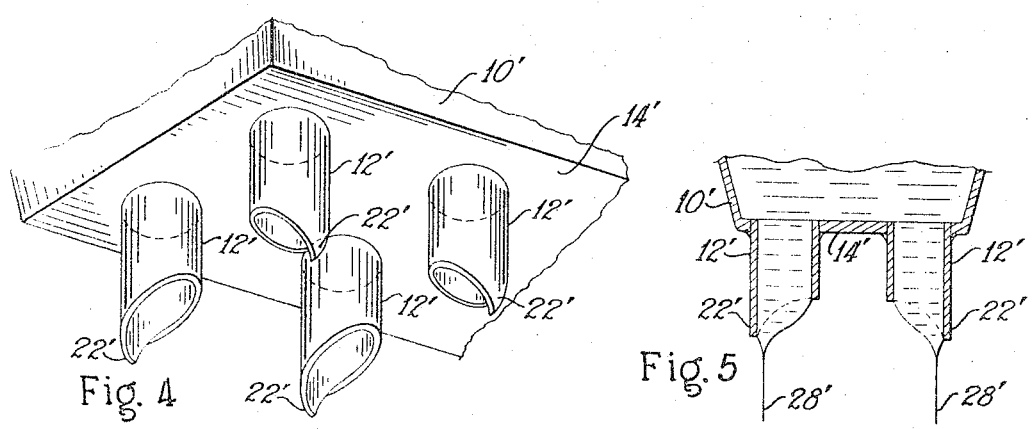
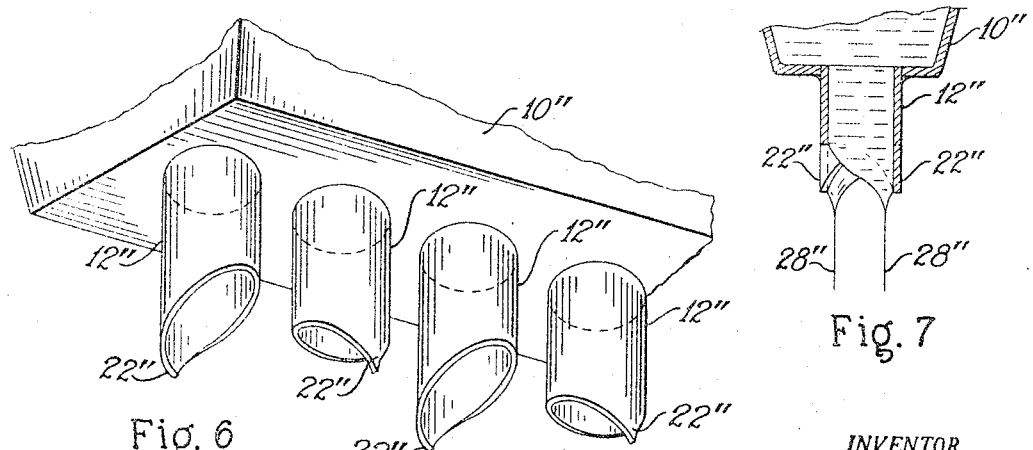
INVENTOR.
CHARLES J. STALEGO
BY
Staelin & Overman
ATTORNEYS United States Patent Office 3,309,184
Patented Mar. 14, 1967

3,309,184
METHOD AND APPARATUS FOR FLOWING STREAMS OF HEAT-SOFTENED MATERIAL FROM A SUPPLY
Charles J. Stalego, Newark, Ohio, assignor to Owens-Corning Fiberglas Corporation, a corporation of Delaware
Continuation of application Ser. No. 167,497, Jan. 22, 1962. This application Aug. 24, 1964, Ser. No. 391,466
15 Claims. (Cl. 65—1)

This invention relates to a method of and apparatus for flowing streams of heat-softened material such as glass from a feeder or supply providing streams of the material for attenuation into fibers of filaments. This is a continuation of my application, Ser. No. 167,497.

It has been commercial practice in the field of attenuating glass or other heat-softened mineral material into fibers or filaments from streams of the glass or other material, to flow the streams through orifices or outlets formed in depending tips or projections provided on the floor or lower wall of a feeder or bushing. Heretofore the exit region of the orificed projections or tips have been defined by a circular edge lying in a horizontal plane or a plane parallel with the floor of the feeder or bushing. In such constructions, particularly where the glass or mineral material is at very high temperatures, and hence at a very low viscosity or highly liquidous condition, the molten glass tends to flood or flow along the exterior surface areas of the projections and along the lower surface of the floor of the feeder or bushing.

Difficulties of flooding have been particularly encountered with a feeder or bushing having two or more rows of orificed tips or projections as the characteristic of flooding usually results in interruption of the operation or joining of two or more streams into a larger one. Also flooding may cause certain streams to be of larger size and others of smaller size. Attenuation of different sized streams of heat-softened material, such as glass, result in the formed fibers or filaments being of nonuniform size. Flooding occurs when the surface tension of the glass or other material overcomes the forces of viscosity and coalescence and especially when the glass is at comparatively high temperatures suitable for attenuation by gaseous blasts to form fibers or glass wool.

The invention embraces a method of flowing a stream of heat-softened mineral material in a manner establishing differentials in temperature and hence viscosity in a cross-sectional region of the stream whereby the tendency of the softened material to flood over surrounding surface areas is substantially reduced or eliminated.

Another object of the invention resides in a method of flowing heat-softened material through an orifice in a manner to establish differential temperatures in the material of the stream at its region of exit from the orifice to increase the viscosity of the heat-softened material in a portion of the stream to thereby reduce the tendency of the material to flood over surrounding areas.

Another object of the invention is the provision of a method of flowing a stream of heat-softened glass or other similar material from a supply through the establishment of surface areas in contact with the stream shaped to distort the stream by effecting a cooling or reduction in temperature of a region of the stream to modify its viscosity and thereby promote improved stability and control of the stream.

An object of the invention is the provision of apparatus for feeding streams of heat-softened mineral material wherein the projections formed with orifices or outlets through which the streams are delivered are shaped to promote the establishment of a region of reduced temperature in a portion of each projection to effect a drawing or distortion of the material of the stream toward the portion of reduced temperature and thereby reduce the tendency of flooding of the material over surrounding surface areas.

Another object of the invention is the provision of an orificed projection through which molten mineral material is flowed to promote the establishment and maintenance of a cold spot or cold region of a surface defining a portion of the orifice to thereby modify the viscosity of portions of the stream to effect improved stability of the stream.

Another object of the invention resides in an orificed tip construction through which a stream of heat-softened mineral material is flowed wherein a surface adjacent the outlet zone of the orifice is configurated with a region or portion arranged to promote a reduction in temperature in an adjacent portion of the stream, the reduced temperature drawing or pulling the heat-softened material to form a stream the axis of which is offset from the axis of the body material in the orifice.

Another object of the invention is the provision of an orificed projection for a glass feeder or bushing or supply means wherein the wall defining the orifice is shaped to provide a portion which depends a greater distance downwardly than other portions of the wall defining the tip to conduct heat away from one portion of the stream and thereby modify the viscosity of the portion of the stream.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is a greatly enlarged elevational view of an orifice construction of the invention illustrated in association with a portion of a feeder or bushing adapted to contain heat-softened material;

FIGURE 2 is a sectional view taken substantially on the line 2—2 of FIGURE 1;

FIGURE 3 is a bottom plan view of the orifice construction shown in FIGURE 1;

FIGURE 4 is an enlarged fragmentary isometric view of a bottom portion of a stream feeder showing an arrangement of tubular projections or tips of the character illustrated in FIGURE 1;

FIGURE 5 is a transverse sectional view through the construction shown in FIGURE 4;

FIGURE 6 is a fragmentary isometric view of a portion of a stream feeder showing a modified arrangement of tubular tips or projections; and FIGURE 7 is a transverse sectional view illustrating the arrangement of tubular tips or projections shown in FIGURE 6.

While the method and apparatus of the invention are particularly usable for flowing groups of streams of heat-softened material such as glass, it is to be understood that the invention may be utilized for flowing streams of other heat-softenable materials and particularly mineral materials such as fusible rock, slag, or the like.

Referring to the drawings in detail and initially to FIGURES 1 through 3, there is illustrated a portion of a receptacle providing stream feeding means, a bushing or feeder 10 which may be formed of metals or metallic alloys, such as platinum rhodium, capable of withstanding the intense heat of the molten mineral material such as molten glass.

The receptacle, feeder or bushing 10 may be secured to a forehearth (not shown) containing a supply of heat-softened glass which flows from the forehearth into the feeder or bushing. The feeder or bushing may be heated by electric energy in a conventional manner to maintain the molten glass in the feeder at a desired viscosity.

The feeder may be provided with a number of tubular projections or orificed tips 12, one of which is illustrated in FIGURES 1 through 3. Each orificed tip or means for flowing a stream of glass from the feeder is preferably of comparatively short, tubular shape, each tip being secured to the floor 14 of the feeder 10 by welding indicated at 16 or by other suitable means. Each tubular tip or projection 12 is comparatively thin walled and is preferably of circular shape in cross-section through which flows the molten glass 18.

The orificed tips illustrated in FIGURES 1 through 3 are illustrated on a greatly enlarged scale. The exit region of each of the orificed projections or tips is particularly configurated to modify or increase the viscosity of a portion of the glass of the stream as it is delivered from the projection 12. The discharge or outlet end of the projection 12 is preferably defined by a curved edge 20 providing a lip portion 22 which terminates in an apex 24. The edge 20 may be planar in shape. The projection 12 may be triangular or other shape suitable for the stated purposes.

Due to the additional surface area provided by the depending portion or lip 22 in contact with one side region of the adjacent body of glass, more heat is conducted away from the glass in the region of the lip 22 than in the other surface area of the tubular projection 12 in contact with the glass.

The lip 22 therefore provides a cold spot or region of slightly reduced temperature. Due to the temperature differential in the material adjacent the depending lip 22, the glass or molten material is drawn to the region of reduced temperature and tends to flow from the apex 24 of the depending lip 22 in the form of a comparatively short cone of glass 26 of which the viscosity is of nonuniform character as the glass of the cone forms the stream 28 with the axis of the cone 26 and stream 28 offset from the axis tubular projection 12.

Thus the glass, as it flows from the tip region 22 of the orifice, tends to pull toward or is drawn toward the depending lip 22. This distortion of the glass in forming the stream avoids or materially reduces the tendency of flooding over adjacent exterior areas of the projection 12 and the lower surface of the feeder floor 14.

The orificed tips or projections of the character illustrated in FIGURES 1 through 3, may be used in various relative positions in a group for flowing a large number of streams from a feeder or bushing. FIGURES 4 and 5 illustrate one pattern or arrangement of a plurality of orificed tips or projections for forming a group of streams of heat-softened material such as molten glass. The tips or projections 12' are secured to the floor 14' of the feeder 10', the tips or projections 12' being disposed lengthwise of the feeder 10' in two rows with the pairs of tips or projections in opposite rows preferably arranged in parallel planes normal to the planes of the rows.

As shown particularly in FIGURE 5, the depending lips or portions 22', of each pair of tips or projections arranged transversely of the feeder 10', are disposed at the outermost regions of the orificed tips or projections whereby the streams 28' from the tips are substantially spaced apart transversely of the feeder providing for greater spacing between fibers or filaments formed from the streams. Through this arrangement the tendency of flooding of the glass along the floor of the feeder between the rows of projections 12' is substantially eliminated whereby streams of uniform character flow from the tips as there is no transfer by flooding of molten glass from one tip to another.

FIGURES 6 and 7 illustrate a modified pattern or arrangement of a plurality of groups of orificed tips or projections 12'' wherein the orificed tips or projections are arranged in a single row lengthwise of the feeder 10'' with the depending lips 22'' of adjacent tips being disposed laterally of a central vertical plane through the axes of the tips in the row whereby the streams 28'' are spaced transversely of the feeder 10'' as shown in FIGURE 7.

While FIGURES 4 and 5 illustrate two rows of orificed tips or projections, and FIGURES 6 and 7 illustrate one row of tips arranged lengthwise of a feeder, it is to be understood that more than two rows may be utilized depending upon the width of the feeder employed and the number of streams to be delivered from a feeder.

Through the use of the orificed tip constructions or tubular projections of the invention, flooding of the molten glass on the exterior surface of the orificed tips and the exterior lower surface of the floor of the feeder construction is substantially reduced or eliminated.

From the foregoing it will be apparent that through the provision of establishing a differential viscosity in the molten glass adjacent its region of discharge or delivery from the depending lips, improved stability and control of the streams is provided whereby streams having more uniform characteristics are flowed from a feeder and therefore fibers or filaments attenuated from the streams are of more uniform size.

It is apparent that, within the scope of the invention, modifications and different arrangements may be made other than as herein disclosed, and the present disclosure is illustrative merely, the invention comprehending all variations thereof.

I claim:

1. The method of processing heat-softened mineral material including flowing the material from a supply through a tubular zone, engaging the material as it flows from the tubular zone with a surface terminating in an apex, conducting heat away from the material by the surface, and flowing a stream of the material from the apex.

2. The method of processing heat-softened mineral material including flowing the material from a supply through a tubular confined zone, flowing the material from the confined zone along a surface defined by converging edges terminating in an apex, conducting heat from the material by the surface to bias the material toward the surface, and flowing the material as a stream from the apex.

3. The method of processing heat-softened mineral material including flowing the material from a supply in a stream feeder through a tubular zone, flowing the material from the confined zone along a surface terminating in an apex, conducting heat from the material through the surface to establish varying viscosities in the material to prevent flooding, and flowing the material from the apex.

4. The method of processing heat-softened mineral material including establishing a supply of the material in a stream feeder, flowing the material from the feeder through spaced passages, engaging the material flowing from each passage with a heat-conducting surface terminating in an apex, conducting heat from the material through the surfaces to bias the material toward the surfaces, and flowing streams of the material from the apices.

5. The method of processing heat-softened mineral material including flowing the material through a tubular zone, flowing the material from the tubular zone along a surface depending from one side of the tubular zone and terminating in an apex, and flowing the material in a stream from the apex.

6. Apparatus for processing heat-softened mineral material including, in combination, a receptacle adapted to contain a supply of the heat-softened material, said receptacle being provided with tubular means through which material is delivered from the receptacle, said tubular means having a wall portion defined by converging edge regions terminating in an apex from which the material flows in a stream offset from the axis of the tubular means.

7. Apparatus for processing heat-softened mineral material including, in combination, a receptacle adapted to contain a supply of heat-softened material, tubular means provided on the receptacle through which material is delivered from the receptacle, said tubular means being formed with a depending wall portion at one side defined by converging edge regions terminating in an apex, said depending wall portion being adapted to conduct heat away from material to bias the material toward the depending wall portion whereby the material flows from the apex in a stream offset from the axis of the tubular means.

8. Apparatus for processing heat-softened mineral material including, in combination, a receptacle adapted to contain a supply of heat-softened material, a tubular metallic member connected with the receptacle through which material is delivered from the receptacle, said tubular member being formed at one side with a depending lip portion defined by converging edges terminating in an apex, said lip portion being arranged to conduct heat away from material adjacent the lip portion to bias the material toward the lip portion, the material being delivered from the apex of the lip portion as a stream offset from the axis of the tubular member.

9. Apparatus for processing heat-softened mineral material including, in combination, a feeder adapted to contain a supply of heat-softened material, tubular means provided on the receptacle through which material is delivered from the feeder, said tubular means being formed with a wall portion defined by curved edge regions converging to an apex from which flows a stream offset from the axis of the tubular means.

10. Apparatus for processing heat-softened mineral material including, in combination, a feeder adapted to contain a supply of heat-softened mineral material, a plurality of tubular metallic members connected to the floor of the feeder through which material is delivered from the feeder, each of said tubular members being formed with a projecting lip portion terminating in an apex, said lip portions being arranged to conduct heat away from the material to establish varying viscosities in the material whereby the material from the tubular zones of the members moves toward the lip portions and flows from the apices of the lip portions as streams offset the axes of the tubular members.

11. Apparatus for processing heat-softened mineral material including, in combination, a feeder adapted to contain a supply of heat-softened mineral material, a plurality of tubular metallic members connected with the floor of the feeder having their axes normal to the floor of the feeder through which material is delivered from the feeder, each of said tubular members being formed at the exit region with a depending lip portion integral with a side wall region of each tubular member, the edges defining the lip portion of each tubular member being in converging relation to form an apex at the terminus of the lip portion, said lip portions being arranged to conduct heat away from the material whereby the material moves toward the lip portions and flows from the apices of the lip portions.

12. Apparatus for processing heat-softened mineral material including, in combination, a feeder adapted to contain a supply of heat-softened mineral material, a plurality of tubular metallic members connected with the floor of the feeder through which material is delivered from the feeder, each of said tubular members being formed with a lip portion at one side wall thereof, the edges defining the lip portions being curved and in converging relation to form an apex, said lip portions being arranged to conduct heat away from the material whereby the material is biased toward the lip portions and flows from the apices of the lip portions as streams offset from the axes of the tubular members.

13. Apparatus for processing heat-softened mineral material including, in combination, a feeder adapted to contain a supply of heat-softened mineral material, a plurality of tubular metallic projections connected with a wall of the feeder through which material is delivered from the feeder, each of said tubular projections being formed at the exit region with a depending lip portion, the edges defining each lip portion being of concave curvature and converging to an apex, said lip portions being arranged to conduct heat away from the material whereby the material moves toward the lip portions, said tubular projections being arranged in rows with the lip portions of adjacent tubular members spaced apart a greater distance than the distance between the axes of adjacent tubular members.

14. Apparatus for processing heat-softened mineral material including, in combination, a feeder adapted to contain a supply of heat-softened mineral material, a plurality of tubular metallic projections connected with the floor of the feeder through which material is delivered from the receptacle, each of said tubular projections being formed at one side with a depending lip portion terminating in an apex, said lip portions being arranged to conduct heat away from the adjacent material whereby the material moves toward the lip portions and flows from the apices, said tubular projections being arranged in two rows with the lip portions of the tubular members in each of the respective rows being disposed at the outermost regions transversely of the feeder.

15. Apparatus for processing heat-softened mineral material including, in combination, a feeder adapted to contain a supply of heat-softened mineral material, a plurality of tubular metallic projections connected with a floor of the feeder through which material is delivered from the feeder, each of said tubular projections being formed at one side with a depending lip portion, the edges defining the lip portion being of concave curvature in converging relation to form an apex, said lip portions being arranged to conduct heat away from the adjacent material to establish varying viscosities in the material whereby the material moves toward the lip portions and flows from the apices of the lip portions, the said projections being arranged in a row with the lip portions of alternate tubular projections being arranged at opposite sides of a central plane through the row of projections.

References Cited by the Examiner
UNITED STATES PATENTS 3,019,078   1/1962   Roberson _____ 65—1 X DONALL H. SYLVESTER, *Primary Examiner.*

S. LEON BASHORE, R. L. LINDSAY,
*Assistant Examiners.*